United States Patent [19]

Graziano

[11] 4,140,970
[45] Feb. 20, 1979

[54] APPARATUS FOR CONTROLLING AN ODOMETER AND SPEEDOMETER SYSTEM OF A VEHICLE

[75] Inventor: Ronald M. Graziano, Saddlebrook, N.J.

[73] Assignee: Sangamo Weston, Inc., Atlanta, Ga.

[21] Appl. No.: 831,562

[22] Filed: Sep. 8, 1977

[51] Int. Cl.² ............................................. G01P 3/48
[52] U.S. Cl. ............................ 324/166; 235/92 PL; 328/48
[58] Field of Search ................. 324/166, 168, 171; 235/92 PL, 92 DN, 92 DM, 92 CC; 328/48, 42

[56] References Cited

U.S. PATENT DOCUMENTS

| | | | |
|---|---|---|---|
| 3,404,343 | 10/1968 | Strand | 328/42 |
| 3,719,807 | 3/1973 | Daley | 235/92 PL |
| 3,845,281 | 10/1974 | Konisi | 235/92 DN |
| 3,947,664 | 3/1976 | Cox et al. | 235/92 CC |

Primary Examiner—M. Tokar
Attorney, Agent, or Firm—W. R. Sherman; Kevin McMahon; David A. Blumenthal

[57] ABSTRACT

Apparatus for controlling an odometer and speedometer system of a vehicle, adjustable for vehicle parameter variations, such as tire size and axle ratio, including a transducer for generating a plurality of initial pulses in response to vehicle movement which pulses control both the vehicle odometer and speedometer. The initial pulses are multiplied by a multiplying factor to produce a train of pulses for each initial pulse. The multiplying factor is in binary form and is selected either according to the position of an array of switches or according to a number retained in a programmable downcounter. The train of pulses is divided by a fixed number to create a driving signal for the odometer and is converted by a frequency converter to drive the speedometer.

15 Claims, 4 Drawing Figures

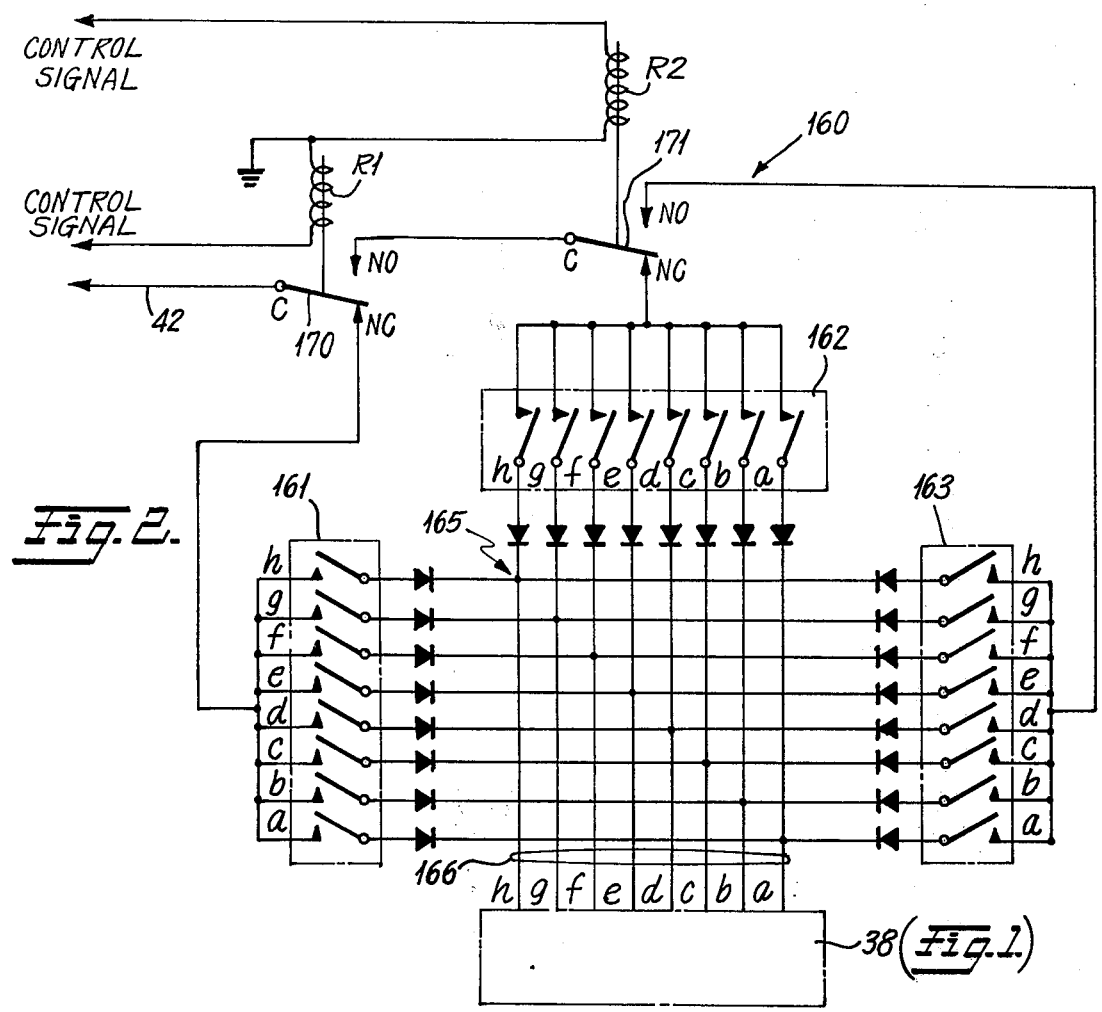
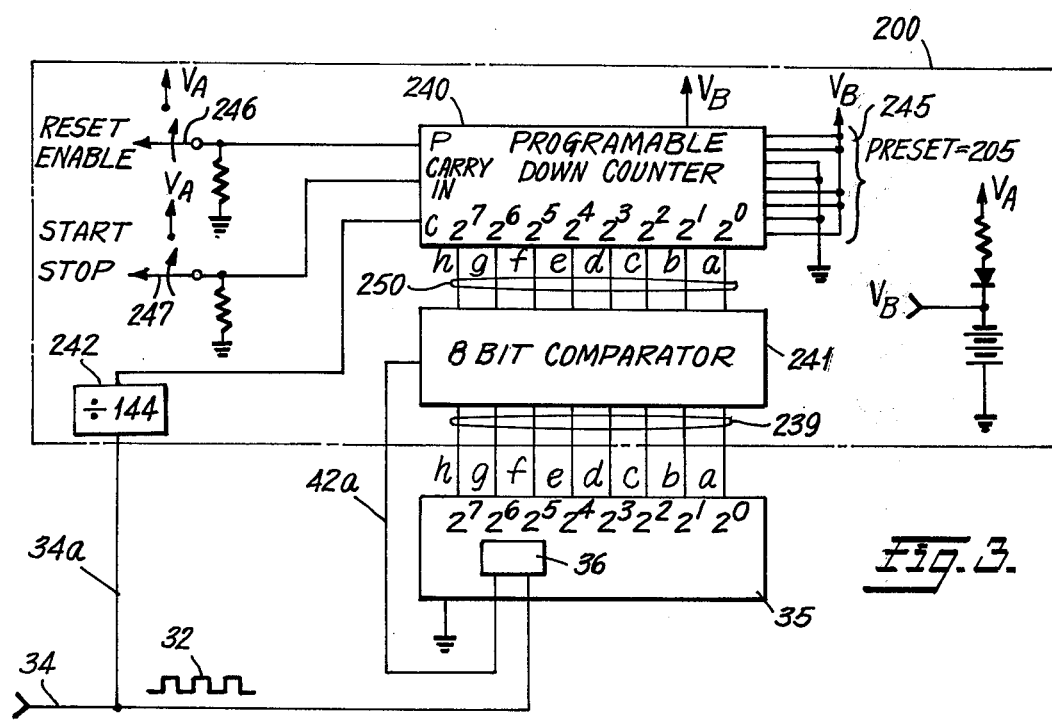

APPARATUS FOR CONTROLLING AN ODOMETER AND SPEEDOMETER SYSTEM OF A VEHICLE

BACKGROUND OF THE INVENTION

1. Field of the Invention

This invention relates to apparatus for controlling odometers and speedometers. More particularly, this invention relates to odometers and speedometers which are driven by electrical pulses and may be adjusted for various conditions which affect indicated distances and speeds of a vehicle.

2. Technical Considerations and Prior Art

Frequently, it is desirable to obtain precise distance and speed measurements. For example, in the trucking industry, accurate distance measurements are needed to determine hauled ton/distance data. Frequently, obtaining accurate distance and speed data is frustrated because trucks may, from time to time, use different size tires.

It is readily seen that over the great distances that trucks now travel, a slight variation in tire size can result in considerable inaccuracy in measuring the actual distance covered. In addition, a variation in tire size makes it difficult for a driver to maintain a desired speed. If the tires are smaller than the norm for which the speedometer of the vehicle is programmed, then more miles than actually covered are recorded while the speed of the vehicle registers higher than it actually is. This means that customers can be overcharged for distance and that the truck may actually be moving slower than desired. In addition, the vehicle may receive periodic maintenance earlier than necessary and thus, the expense of maintaining the vehicle may be increased. On the other hand, if the tires are larger than necessary, it is likely that customers will be undercharged for actual mileage driven and that the vehicles will tend to travel at slightly excessive speeds. In addition, the vehicles will tend to exceed their maintenance periods and therefore, wear out earlier. Furthermore, if the vehicles travel at excessive speeds for long periods of time, then they will burn additional fuel. Essentially, since the vehicles, such as trucks, cover great distances, it is necessary that the operators have an accurate measure of the actual usage to which the vehicles are put.

Prior art awareness of this problem is exemplified by U.S. Pat. Nos. 3,865,305 to Sampey; 3,748,580 to Stevens; and 3,739,270 to Miller et al. However, in Sampey, calibration is manual and there is no speedometer function. In Stevens, the function of a speedometer is included with a manually set, measured-mile type of calibrate mode and in Miller et al calibration is accomplished by interchangeable plug-in modules. The following patents are also cited as being of interest with respect to prior art: U.S. Pat. Nos. 3,991,368 — Powell; 3,947,664 — Cox et al; 3,916,174 — Moule; 3,868,570 — Kopera, Jr.; 3,846,701 — Sampey; 3,824,694 — Lesperance et al; 3,614,617 — Blake, Jr.; 3,446,947 — Overstreet, Jr.; 3,396,333 — Hin Hung Ho et al; 3,739,270 — Miller et al.

In view of the foregoing considerations, there is need for a programmable odometer and speedometer which, among other things, will be of assistance to the trucking industry to help in properly determining distance and speed measurements. Furthermore, this need extends to analogous situations where there is need for accurate distance and speed measurement.

OBJECTS OF THE INVENTION

It is an object of the instant invention to provide a new and improved odometer and speedometer system which utilizes electrical pulse counts to determine distance and speed.

It is a further object of the instant invention to provide a new and improved programmable odometer and speedometer system which is of particular use to the trucking industry.

It is still a further object of the instant invention to provide a new and improved programmable odometer and speedometer system which can be easily and readily calibrated.

It is a further object of the instant invention to provide a new and improved programmable odometer and speedometer system wherein both the odometer and speedometer are calibrated by a single adjustment.

It is a further object of the instant invention to provide a new and improved programmable odometer and speedometer system which is readily adaptable for use with multi-speed rear axles of trucks.

SUMMARY OF THE INVENTION

With these and other objects in mind, the instant invention contemplates an apparatus for controlling an odometer and associated speedometer of a vehicle wherein the odometer and speedometer are driven by electrical pulses. The apparatus includes means for generating initial pulses upon rotation of an element of the vehicle and multiplier means for generating a train of pulses upon receiving each initial pulse. The multiplier means further includes selection means associated therewith for selecting the number of individual pulses in each train whereby the apparatus may be programmed to accommodate various conditions of the vehicle with which the system is used. The train of pulses from the multiplier means is then applied to a divider which divides the train of pulses by a fixed number to produce a train of driving pulses which are subsequently shaped and applied to the odometer. The speedometer is driven by a signal derived from the train of pulses, whereby the signal driving the speedometer is proportioned to the frequency of the train of pulses.

BRIEF DESCRIPTION OF THE DRAWINGS

A more complete description of the invention is set forth in the following detailed description taken in conjunction with the drawings wherein:

FIG. 2 is a schematic electrical circuit diagram of a switching circuit which readily adapts the circuit of FIGS. 1A and 1B to vehicles, such as trucks, which may have multi-speed differentials or rear axles; and FIG. 3 is a schematic diagram of an electrical circuit for programming a speedometer and odometer wherein calibration of the circuit of FIGS. 1A and 1B is effected by driving a measured distance.

DETAILED DESCRIPTION OF THE DRAWINGS

In a moving vehicle, a transmission or wheel mounted pulse generator transducer produces X pulses per unit of distance (X PPUD), e.g. 15200 pulses per mile (PPM). Transducer design and variables such as tire diameter affect the exact number of PPUD. In order to totalize distance traveled, the system according to the illustrated embodiment of the invention is designed to require a fixed number, Y PPUD, (for example, 15,000 pulses per mile) to be received by the odometer. Thus, a fixed number, Y PPUD is set as a standard by which the odometer and speedometer are calibrated.

To convert the required Y PPUD from the actual X PPUD, a constant Z must multiply X such that (X). (Z) = Y. Z is a fraction greater than 1 or less than 1 and is adjustable since Z will be different for each vehicle and for variable tire sizes, gear ratios, etc., within the same vehicle. In this example: X = 15200 PPM, Y = 15000 PPM, and Z = Y/X = 15000/15200 = 0.986. In the illustrated embodiment, multiplication by Z is implemented electronically in two stages - the first stage being multiplication by a variable multiplier and the second stage being division by a fixed divider. Thus, for example, the first stage is programmed to multiply by an integer N between 1 and 99 and the divider stage is designed to divide by 50. The output is the fraction N/50. In the foregoing example, if N is 49, the output would be 0.98 closely approximating the required value of Z.

Figure 1A:
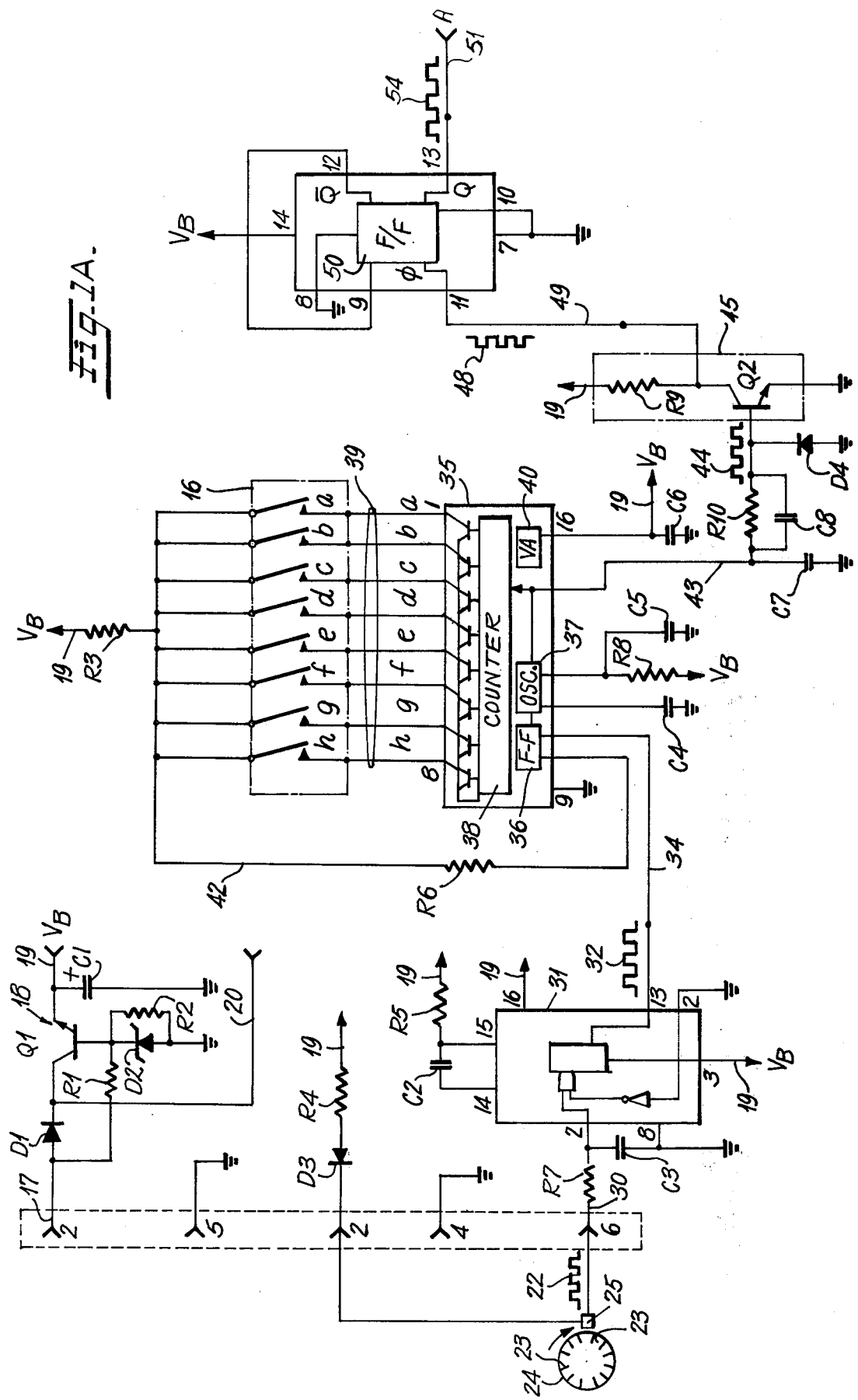
FIGS. 1A and 1B show a schematic diagram of an electrical circuit, according to the instant invention, for driving an odometer and associated speedometer.
Figure 1B:
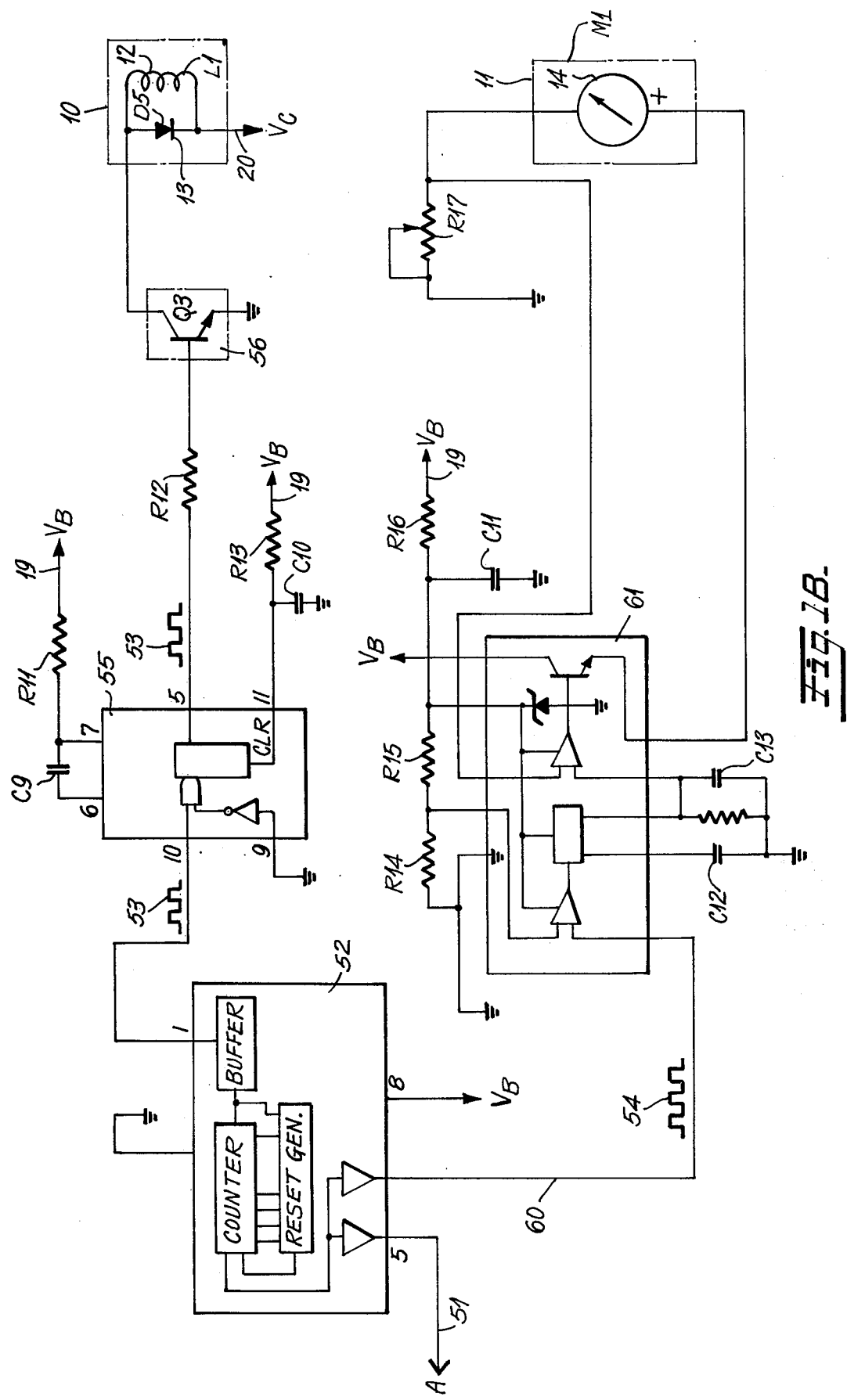

FIGS. 1A and 1B show apparatus, according to the invention, for performing the algorithm set forth above. In the figures, numbers having no associated arrow or line surrounding integrated circuit representations indicate terminal pin numbers. An odometer 10 and speedometer 11 are shown for displaying distance and speed respectively. While the odometer 10 is illustrated in the form of an electromechanical totalizer in which a solenoid 12, compensated for by a rectifier 13, drives a series of cascaded indicator wheels (not shown), it might also be implemented with the use of other display devices such as LED displays. In the same vein, while the speedometer 11 is shown as an ammeter 14, other approaches such as LED electrical displays may be used. Electro-mechanical indicators are preferred, however, because they are less expensive and require no battery for their memory function.

The circuitry driving the odometer 10 and speedometer 11 is configured to adjust the display of the odometer and speedometer so as to reflect at any desired time, both the actual distance covered and the rate at which that distance is being covered. As will be further explained hereinafter, the displays of the odometer 10 and speedometer 11 are controlled by a switch box 16 which includes eight switches 16a-16h. By closing an appropriate array of the switches 16a-16h, the odometer 10 and speedometer 11 are calibrated to compensate for various changes in vehicle equipment and drive ratios so that the odometer and speedometer readings always reflect true distance and speed, respectively.

Referring now to the details of FIGS. 1A and 1B, the circuitry of the invention is described as utilized with a motor vehicle such as a truck. Operating voltages are taken from a bus 17 connected to the battery of the vehicle (not shown). A voltage regulator 18 accepts normal power of 10 to 16 volts from the bus 17 and limits an output on power line 19 to approximately 15.5 volts. Under abnormal conditions, such as a high voltage transient of, for example, 120 volts for 50 milliseconds or a 24 volt boost start, the voltage regulator 18 provides protection for the system. In addition, the voltage regulator 18 may have an output 20 which powers the odometer 10. As can be seen from the circuit diagram, the output 19 powers all of the solid-state elements of the system and where necessary is applied through an appropriate R-C circuit.

The odometer 10 and speedometer 11 ultimately display a signal which is initiated by a transducer 21 that generates a plurality of initial pulses 22 by monitoring a circular array of spaced indicia 23 disposed on a rotating element 24 of a motor vehicle. The rotating element may be, for example, wheel element, a transmission element or rear axle element. The spaced indicia 23 may be optical elements which pulse a transmitter 25 each time one of the optical elements is aligned with the transmitter. Alternatively, the transducer may be magnetic wherein each element 23 is a iron slug which causes the transmitter 25 to emit a pulse each time a slug is registered with the transducer. In any event, a plurality of initial pulses 22 are impressed on an input 30 as long as the motor vehicle element 24 is rotating. The odometer 10 and speedometer 11 ultimately display signals which are indicative of, respectively, the number of and frequency of the pulses 22.

The initial pulses 22 are fed through additional circuitry where the total number of pulses is multiplied and then divided and subsequently shaped, for driving the odometer 10. This process begins with an input signal conditioner 31 which is preferably a monostable multivibrator such as model MM74C221 (National Semiconductor). The input signal conditioner 31 is protected by current limiting resistors R5 and R7 in power line 19 and input 30, respectively. The purpose of R5 is to form an RC circuit which determines the pulse width of pulse 32. A capacitor C3 cooperates with other impedances to form a low-pass filter to prevent interference signals from triggering the input signal conditioner 31. The input signal conditioner 31 is essentially a monostable multivibrator which generates a single pulse 32 upon receiving the positive rise of a single pulse 22 from the transducer 21.

The pulses 32 form a train of pulses which is applied over line 34 to a multiplier 35 that is preferably in the form of an integrated circuit such as the programmable timer/counter Model 8240 (Intersil). The line 34 carrying the train of pulses 32 is connected to a flip-flop 36 within the multiplier 35 which has outputs to an oscillator 37 and a counter 38. In essence, the oscillator 37 generates a train of pulses 44 while the counter 38 limits the number of pulses 44 in the train. The flip-flop 36 turns the oscillator 37 on upon receiving a pulse 32, and shuts the oscillator 37 off after the counter 38 has counted up to a programmed number N. The multiplier 35 therefore, generates a plurality of pulses 44 for each pulse 32 received.

Operation of the multiplier 35 is initiated upon triggering the control flip-flop 36 with the positive rise of a pulse 32 from the input signal conditioner 31 over the line 34. The flip-flop 36 enables the normally disabled oscillator 37. Consequently, the oscillator 37 only generates pulses 44 when the pulses 32 are present over line 34 indicating that the vehicle is in motion. With each output pulse of the oscillator 37, the counter 38 indexes one number.

The counter 38 is an eight-bit counter having open collector transistor taps 39a-h. As with the oscillator 37, the counter 38 is powered from the output of the voltage regulator 18, which in the case of the counter is preregulated by a regulator 40 within the integrated circuit chip 35.

In order to program the counter 38, and thus calibrate the odometer 10 and speedometer 11, selected switches 16a-16h are closed to connect the associated transistor taps 39a-39h and thereby determine a multiplying factor N. The counter 38 can be programmed for any integral number between 1 and 256 by setting the switches 16a-16h. For example, if only switches 16c, 16f and 16g of the switch box 16 are closed, the decimal number 100 is read into the counter, and on the count of 100, the AND connection established by a connector wire 42 linking switches 16c, 16f and 16g goes high, causing the control flip-flop 36 to be reset which in turn disables the oscillator 37 and resets the counter 38. Accordingly, for each pulse 32 there are 100 pulses generated by the oscillator 37. The output of the multiplier 35 is impressed over an output line 43 and produces N pulses 44 for a single input pulse 32, where N is the decimal number between 1 and 256 programmed as a binary number by the configuration of switches 16a-16h. Upon receipt of the next pulse 32, the multiplier 35 again produces N pulses 44. Consequently, the total output of multiplier 35 is equal to N times the number of input pulses 32. In order for the system to function properly, the period of each train of pulses 44 is short enough to be completed within the period of the shortest meaningful interval between the initial pulses 22 from transducer 21. It should be kept in mind that the signal on line 43 consists of a plurality of trains of pulses 44 because an additional train is generated each time an indicator 23 registers with the transmitter 25.

The trains of pulses 44 pass through a transistorized level inverter 45, which inverts and amplifies the pulses to produce positive-going trains of pulses 48 having a bias equal to the voltage on line 19 reduced by resistor R9.

The pulse trains 48 are applied over a line 49 to data flip-flop 50 which is a D-type flip-flop that triggers on the positive-going signal 48 and divides the signal by two. The data flip-flop 50 is preferably an integrated circuit such as model MC14013B (Motorola), and is used in the circuit primarily to clean up the pulses.

The outputs from flip-flop 50 are trains of pulses 54 which are applied over line 51 through a 17-stage programmable oscillator/divider 52, which is an integrated circuit of conventional design such as Model MM5369N (National Semiconductor) that is mask programmed to divide by 75,000. The divider 52 provides a constant division of 75,000 which combines with the division by 2, introduced by the divider flip-flop, 50 to produce a constant effective division of pulse train 48 by 150,000. The initial pulse train 22 is thus multiplied by N and divided by 150,000 to produce pulses 53 for feeding to odometer 10.

If the odometer 10 happens to be an electromechanical totalizer, the pulses 53 are uniformly lengthened before being applied to the totalizer. Accordingly, a signal conditioner 55 which is a monostable multivibrator similar to that used for the input signal conditioner 31 is used to shape the pulses 53. If necessary, an amplifier 56 increases the power of the signal from the conditioner 55 so that the signal has sufficient power to drive the odometer 10.

The train of pulses 54 from flip-flop 50 is also applied to a frequency/voltage converter 61 over a line 60, which bypasses the dividing function of divider 52. Line 60 may also be connected directly to line 51. The frequency to voltage converter 61 converts the frequency of the train of pulses 54 to a voltage signal appropriate for driving the speedometer 11 which in the preferred embodiment is in the form of an ammeter.

The pulse train 54 on line 51 and line 60 has a frequency indicative of vehicle velocity in as much as it is directly dependent on the number of pulses 22 produced by the transducer 21 during a given interval of time. Consequently, by setting a single selecting means in the form of, for example, switch box 16, both the odometer 10 and speedometer 11 may be easily calibrated.

Example of Operation of the System of FIG. 1

The operation of the apparatus of FIGS. 1A and 1B may be illustrated with a simple example. In a typical case, there are 15 indicators 23 on rotatable vehicle element 24. The multiplier 35 is programmed by switch box 16 to multiply by 100 for a 1,000 revolution-per-mile transmission output. The programming is accomplished, for example, by flipping switches 16c, f, and g, so that the wire ANDed output on line 42 goes high when a count of 100 occurs. Accordingly, at the multiplier output line 43 a pulse train having $1.5 \times 10^6$ pulses 44 per mile is produced. This count is then divided by 2 in the divider 50 to produce $7.5 \times 10^5$ pulses per mile which translates into 208.33 Hz at one mile per hour. The output of $7.5 \times 10^5$ pulses per mile is then divided by 75,000 in the divider 52 so as to produce 10 pulses per mile for the odometer 10. Consequently, each time a pulse 53 is received by the odometer 10, it will index one tenth of a mile. After .10 indexes, the odometer records one mile as is done in conventional odometers used with motor vehicles.

The frequency to voltage converter 61 converts the pulses (occuring at the rate of 208.33 Hz for each mile per hour) to a voltage signal which drives a current to move the indicating needle of ammeter 14, which constitutes the speedometer 11. Consequently, if the divider 50 has an output of 10,416.5 Hz, the speedometer 14 will read 50 miles per hour.

If the transmission output is other than 1,000 revolutions per mile, a new multiplying factor may be set. For a system to produce 10 pulses per mile (p.p.m.) at the odometer, where the transducer produces, illustratively, 15 pulses per revolution (p.p.r.), and the measurement system introduces a dividing factor of 150,000 the formula becomes:

$$10 \text{ p.p.m.} = \frac{R(\text{rpm}) \cdot 15\text{ppr} \cdot N}{150,000} \cdot \text{Hence, } N = \frac{100,000}{R}$$

where N is the multiplying factor and R is the number of revolutions per mile measured at the vehicle transmission output.

If the transducer 21 is a wheel-mounted transducer which produces 60 pulses per revolution, for example, and the tire on the wheel produces 500 revolutions per mile, then the multiplying factor is derived in the manner stated above, subustituing the new value for the pulses per revolution. Hence, the multiplying factor is:

N = 25,000/R, where R is the number of revolutions per mile of the tire. Accordingly, N becomes 50 and the multiplier 35 is set by the switches 16a-16h to 50.

It is readily seen that the aforecited formulas can be tabulated for popular transmission and tire sizes enabling one to calibrate both the odometer and speedometer of a particular vehicle without the need of additional procedures. By simply setting the switches 16a-16h, both the odometer 10 and speedometer 11 can be simultaneously calibrated for any vehicle.

Multiple-speed Axle Adapter

Referring now to FIG. 2, there is shown a two- and three-speed adapter 160 for use with trucks having either two- or three-speed axles. The adapter 160 is used in place of the switch box 16 and primarily differs from the switch box 16 in that there are three switch arrays 161, 162 and 163 instead of a single switch array. Each of the switch arrays 161, 162 and 163 includes 8 switches a-h which form a binary system that can program the multiplier 35 (FIG. 1A) for any integral number between 1 and 256.

The switch array 161 is used to program multiplier 35 when using the first axle ratio, switch array 162 for the second axle ratio; and the switch array 163 for the third axle ratio. The outputs from counter 38 (FIG. 1A) feed switching arrays 161, 162 and 163 via a grid 165. The output of the selected array 161-163 is fed via line 42 to flip-flop 36 of FIG. 1A.

In operation, only the switches a-h of one of the switch arrays 161, 162 or 163 are operable at any time. For example, if the truck is to use the first axle ratio, then selected ones of the switches 161a–161h are closed, while the condition of the other switches is immaterial.

Selection of the particular switch array is achieved by means of relay switches 170 and 171. If the first axle ratio is used, relay coils R1 and R2 of relay switches 170 and 171 respectively are left unenergized and the ANDed output of switch array 161 is passed to output line 42. If relay coil R1 is energized, as, for example, by a control signal associated with the operator selection of the second axle ratio, switch array 162 is selected via relay switch 170. If both coils R1 and R2 are energized, switch array 163 is selected via relay switches 170 and 171.

THE EMBODIMENT OF FIGURE 3 - ODOMETER, SPEEDOMETER CALIBRATION BY DRIVING A MEASURED DISTANCE

A particular simplicity realized with the calibration technique described herein is the ability to calibrate both the vehicle odometer and speedometer by driving the vehicle (at any speed) over a measured distance, i.e. one mile. Only a few switches need to be closed in calibrating the apparatus which may readily be recalibrated for any change in operating parameters.

Referring now to FIG. 3, there is shown a calibrator, generally designated by the numeral 200, which has eight leads 239a–h that connect to transistor taps 39a–h extending from the multiplier 35 of FIG. 1. The calibrator 200 replaces the switch box 16 and includes a programmable downcounter 240, an eight-bit comparator 241 and a divider 242. The calibrator may be configured as a plug-in unit in which projecting contacts connected to leads 239a–h plug into jacks connected to transistor taps 39a–h.

As a first step in calibrating the odometer and speedometer of the vehicle, the programmable downcounter 240 is preset with a fixed number which is inputted over lines 245 upon closing a momentary contact switch 246. When the vehicle passes a first marker indicating the beginning of the measured distance, a switch 247 is closed to initiate counting by the programmable downcounter 240. The programmable downcounter 240 receives pulses 32 over line 34a generated by the transducer 21 (FIG. 1A) which are divided by the division circuit 242. For division by 144, the programmable downcounter 240 will index, or count down, once for every 144 pulses 32 applied over line 34a. When the operator opens the switch 247 upon passing a marker indicating the end of the measured distance, the downcounter ceases to count. Consequently, at the end of the measured distance, the programmable downcounter 240 is set to a fixed number, N, of pulses. The calibration process is now complete and both the odometer and speedometer are simultaneously calibrated.

As an example, assume that R, the number of revolutions per mile of the vehicle rotating element, is 1,000. For a transducer producing, for example, 15 pulses per revolution, the total number of pulses measured appearing on line 34a is 15,000. The number of countdown pulses is then $15,000/144 \approx 104$ so that the initial preset number of 205 in counter 240 is diminished by 104. The number of counts remaining in counter 240 (205-104 = 101) is retained in counter 240 and used together with comparator 241 to replace the switch box 16 of FIG. 1. Thus, in operation of the odometer, for example in the non-calibration mode, multiplier 35 will effectively be set with a number N equal to the count remaining in counter 240. Counter 240 and comparator 241 take the place of switch box 16 of FIG. 1A. Consequently, for N=101, there will be 15,000 pulses × 101 = 1,515,000 produced at the output of multiplier 35. These pulses are divided by 150,000 (2 × 75,000) to give approximately 10 pulses per mile at the input to the odometer.

In another example one may assume R = 1115 so that the total number of countdown pulses to counter 240 is 116 leaving counter 240 with a count of 89. Thus, N = 89. During running mode, the number of counts 1115 × 15 per mile is multiplied by N (89) and divided by 150,000 again to yield approximately 10 pulses per mile. The calibration algorithm is effective over the expected range of R for most practical applications, namely, R having values between 800 and 1200.

In non-calibration operation, the programmable downcounter 240 is connected via eight lines 250 to the eight-bit comparator 241. The eight-bit comparator 241 also receives signals from the multiplier 35 over lines 239a–239h. Each time the output from the programmable downcounter 240 matches the output over lines 239a–239h of the multiplier 35 in the eight-bit comparator 241, an output is generated over line 42a which resets the flip-flop 36 in the multiplier 35 to achieve a multiplication by N exactly as discussed above in relation to FIG. 1.

Just as with the system of FIG. 1A, the system of FIG. 3 works as a multiplier where "N" pulses are produced for each pulse 32 received from line 34. With the calibrator 200, it is no longer necessary to manually close each of the switches 16a–h as with the system switch box 16 in FIG. 1A. Rather, programming is effected automatically by closing start/stop switch 247 at the beginning of the measured distance and opening the start/stop switch at the end of the measured distance. Thereafter, the programmable downcounter 240 assumes the function of the switch array 16a–h of FIG. 1A. From the foregoing description it will be evident to those skilled in the art that the present invention is capable of taking various useful forms, and it is preferred, accordingly, that this description be taken in an illustrative sense, and that the scope of protection afforded be determined by the appended claims.

I claim:

1. Apparatus for controlling an odometer and speedometer of a vehicle cooperating with a rotatable element of said vehicle indicative of movement of said vehicle, comprising:

transducer means for generating initial pulses in response to rotation of said rotatable element;

multiplying means connected to said transducer means for producing a train of pulses upon receipt of each initial pulse, said multiplying means including means for selecting a multiplying factor corresponding to an existing condition of the vehicle affecting the distance covered by the vehicle per revolution of said element;

divider means receiving the train of pulses for dividing the train of pulses by a fixed number to produce a subsequent pulse train having a frequency suitable for driving said odometer;

means for connecting said odometer to receive said subsequent pulse train;

frequency conversion means for converting said train of pulses into a signal suitable for driving the speedometer; and means for connecting said speedometer to said frequency conversion means.

2. The apparatus according to claim 1 wherein said means for selecting a multiplying factor comprises an array of switches which are programmable to generate the multiplying factor in binary form.

3. The apparatus according to claim 2 wherein the selection means includes a plurality of separate switch arrays wherein each array of switches is programmable to generate separate multiplying factors in binary form and wherein each input is associated with a separate rear axle ratio of the vehicle.

4. The apparatus according to claim 1 wherein said multiplying means includes:

an oscillator for generating the train of pulses;

a counter for limiting the number of pulses in each train of pulses to a number equal to said multiplying factor, wherein said counter communicates with said selecting means; and flip-flop means communicating with said transducer means and with said oscillator for initiating operation of said oscillator upon receiving an initial pulse, said flip-flop means cooperating with said selecting means and said counter for resetting said counter after said counter has counted to said multiplying factor and for turning off said oscillator when said counter is reset.

5. The apparatus according to claim 4 wherein said means for selecting a multiplying factor includes an array of switches which are programmable to generate the multiplying factor in binary form.

6. The apparatus according to claim 5 wherein said selection means includes a plurality of separate switch arrays wherein each array of switches is programmable to generate separate multiplying factors in binary form and wherein each switch array corresponds to a separate rear axle ratio of the vehicle.

7. The apparatus according to claim 1 wherein said frequency conversion means comprises frequency-to-voltage conversion means and said speedometer comprises a meter responsive to current produced by said voltage.

8. Apparatus for controlling an odometer and speedometer of a vehicle cooperating with a rotatable element of said vehicle indicative of movement of said vehicle, comprising:

transducer means for generating initial pulses in response to rotation of said rotatable element;

multiplying means for producing a train of pulses upon receipt of each initial pulse, said multiplying means including means for selecting a multiplying factor corresponding to an existing condition of the vehicle affecting the distance covered by the vehicle per rotation of said element;

said selecting means including means, responsive to the number of rotations of said rotatable element caused when said vehicle is driven over a measured distance, for programming said multiplying means by providing said selecting means with signals representing a number equivalent to said multiplying factor;

divider means receiving said train of pulses and dividing said train of pulses by a fixed number to produce a subsequent pulse train having a frequency suitable for driving said odometer;

means for connecting said odometer to receive said subsequent pulse train;

frequency conversion means for converting said train of pulses into a signal suitable for driving said speedometer; and means for connecting said speedometer to said frequency conversion means.

9. The apparatus according to claim 8 wherein said multiplying means includes:

an oscillator for generating said train of pulses;

a counter for limiting the number of pulses in each train of pulses to the multiplying factor, wherein said counter is responsive to said selecting means which determines said multiplying factor; and flip-flop means, responsive to said transducer means, for initiating operation of said oscillator upon receiving an initial pulse and communicating with said selecting means and counter for resetting said counter after said counter has counted to said multiplying factor and for turning off the oscillator when said counter is reset.

10. The apparatus according to claim 9 wherein said counter and selecting means are programmable in binary form.

11. The apparatus according to claim 10 wherein said selecting means includes a second counter responsive to said transducer means;

a comparator responsive to said second counter and communicating with said first named counter and flip-flop;

said second counter adapted to signal said flip-flop to reset said first-named counter and to turn off said oscillator.

12. The apparatus according to claim 11 wherein said second counter includes:

means for presetting said counter with a number from which to count down;

switch means for initiating operation of said second counter when said vehicle commences moving over said measured distance, and for stopping operation of said second counter upon covering said measured distance; and divider means for dividing the initial pulses by a fixed number to reduce the number of pulses applied to said second counter.

13. The apparatus according to claim 8 wherein said frequency conversion means comprises frequency-to-voltage conversion means and said speedometer comprises a meter responsive to current produced by said voltage.

14. The apparatus according to claim 8 wherein said selecting means comprises means for automatically establishing said multiplying factor to provide a substantially constant number of pulses to said odometer for a range of the number of revolutions of said rotating element per measured distance traveled by said vehicle.

15. The apparatus according to claim 14 wherein said range is between about 800 and 1200 revolutions per mile.

* * * * *